United States Patent
Diomelli

(10) Patent No.: US 7,817,645 B2
(45) Date of Patent: Oct. 19, 2010

(54) METHOD OF HANDLING PHONE COMMUNICATIONS AND RELATED EQUIPMENTS ON LANS SUPPORTING VOICE AND DATA TRANSMISSION IN AN INTERGRATED WAY

(75) Inventor: Giuseppe Diomelli, Lari (IT)

(73) Assignee: GEFA S.R.L., Pontedera (IT)

( * ) Notice: Subject to any disclaimer, the term of this patent is extended or adjusted under 35 U.S.C. 154(b) by 1358 days.

(21) Appl. No.: 10/512,830

(22) PCT Filed: Oct. 16, 2002

(86) PCT No.: PCT/EP02/11739

§ 371 (c)(1), (2), (4) Date: Oct. 28, 2004

(87) PCT Pub. No.: WO03/094480

PCT Pub. Date: Nov. 13, 2003

(65) Prior Publication Data

US 2005/0169246 A1    Aug. 4, 2005

(30) Foreign Application Priority Data

Apr. 30, 2002   (IT) .......................... PI2002A0026

(51) Int. Cl.
*H04L 12/56* (2006.01)
(52) U.S. Cl. .................. 370/401; 370/395.53; 370/352; 370/400; 379/100.01
(58) Field of Classification Search ................ 370/352, 370/400, 401
See application file for complete search history.

(56) References Cited

U.S. PATENT DOCUMENTS

| 5,892,764 | A * | 4/1999 | Riemann et al. ............ 370/401 |
| 6,628,644 | B1 * | 9/2003 | Nelson et al. ............... 370/352 |
| 2007/0297394 | A1 * | 12/2007 | Allan et al. ................ 370/356 |

FOREIGN PATENT DOCUMENTS

DE    19928070    12/2000

(Continued)

OTHER PUBLICATIONS

Brockbank R et al., Click Dial Web-Enabled CTI, British Telecommunications Engineering, London, GB, vol. 19, No. 1, Apr. 1999.

(Continued)

*Primary Examiner*—Ahmad F Matar
*Assistant Examiner*—Antim Shah
(74) *Attorney, Agent, or Firm*—Roylance, Abrams, Berdo and Goodman, LLP

(57) ABSTRACT

On a LAN which supports the transmission of data, including multimedia, and digitalized telephone communications, in an integrated way, a method of handling telephone communications and related equipments provides for the exclusive installation in the central processing unit, or network server, specific software dedicated to controlling, monitoring and handling of telephone communications and related equipments. The method provides for the activation of the specific software using a standard Internet browser for sending commands and for the exchange of data on the network, through immediate interaction on bar type graphs (21) on the visualization means of the LAN peripheral computers. The software enables the continuous visual monitoring of the status of the telephone communication in progress or other communications on arrival or on hold.

11 Claims, 2 Drawing Sheets

FOREIGN PATENT DOCUMENTS

| | | |
|---|---|---|
| EP | 0 829 995 A2 | 3/1998 |
| EP | 0829995 | 3/1998 |
| WO | WO 00/78025 A1 | 12/2000 |

OTHER PUBLICATIONS

Patzer J, Telefonieren Sie Zeitgemaess? Kommunikation Im Zeitalter Von Cti Und Voip, Net-Zeitschrift Fuer, Kommunikationsmangaement, Huthig Verlag, Heilderberg, DE, vol. 55, No. 9, 2001, pp. 19-21.

Patent Office of the People's Republic of China, "First Office Action", Jul. 18, 2008, Beijing, China.

Patent Office of the People's Republic of China, "Second Office Action", Jan. 22, 2010, Beijing, China.

* cited by examiner

METHOD OF HANDLING PHONE COMMUNICATIONS AND RELATED EQUIPMENTS ON LANS SUPPORTING VOICE AND DATA TRANSMISSION IN AN INTERGRATED WAY

FIELD OF THE INVENTION

This invention concerns a method of handling phone communications and related equipments on local area computer networks which support data transmission and phone communications in an integrated way.

DESCRIPTION OF THE PRIOR ART

In IT-PI2000A000075 patent application, filed by the same applicant, an apparatus, and corresponding method, for integrating telephone communication and data transmission onto a LAN was disclosed. Said computer network (LAN) is provided with central and peripheral processing units which include analogical/digital converters of telephone voice messages into data packets and D/A converters for the inverse operation; in particular, the central processing unit, or network server, is provided with hardware and software means able both to convert telephone voice messages originating from the external telephone network and the priority transmission onto the LAN, and to detect the data packets related to the telephone messages originating from telephones connected to the LAN and the priority transmission of said packets to the external telephone network or other telephone sets connected to the local network.

In order to ensure proper functioning of the above telephone equipments, both in case these are connected to peripheral computers, (clients), and in case they are autonomous, in the subsequent IT-PI2000A000081 patent application, filed by the same applicant, a specific apparatus for connecting telephone equipments and peripheral computers to a LAN working according to the process set out above, was disclosed. It is clear, in fact, that although nowadays, and still more in the future, where a LAN is working, an usual working position involves both the installation of a telephone and the use of a peripheral computer (client), we can however find autonomous telephonic equipments, not connected to any computer, such as facsimile machines or other commonly used telephone sets.

We can easily understand that in a high technological environment, such as that described in the patent applications referred to above, the handling of telephone communications and related equipments, whether autonomous or connected to the LAN computers, should follow a specific method which allows the maximum benefit to be derived from the technology potential, and in particular information technology, used in such environment, and accordingly to achieve both an effective processing of telephone communication historical and handling parameters and an innovative control and real time monitoring activity of the telephone call itself.

In DE-199 28 070, the above target of obtaining the maximum benefit from exploiting the information technology potential in the telephone communications handling over LANs is addressed; in particular, the main object of the invention of DE-199 28 070 is to offer the availability of Desktop functions to the users of all telecommunication equipments connected to a local computer network, by minimizing the cost for installing and maintaining the software needed to support said functions. This is achieved through a specific circuitry which comprises, among others, an intelligent telecommunication apparatus (TKA or PABX), an integrator element, a LAN server, a connection element, a file server and a Web server; by means of this last server, the CTI functions are offered to the LAN telephone equipment users for the control and the visualization of the status of the communication terminals, and there are offered also, by means of browser Web techniques, the visualization and the inputting of data concerning the telephone conversations.

So, through the above solution, a certain minimization of the software associated to each communication terminal is achieved, but it has to be noticed that this is obtained only by a quite complex hardware layout and only in respect of the control and display of the status of the communication terminals and elements for display and inputting of data concerning the telephone conversation, and not in respect of the handling of the telephone communication. Really, the phone communication handling is obtained by means of traditional telephones connected to traditional apparatus (intelligent TKA or PABX) or by internet-telephones connected to the LAN and managed by a dedicated internet-telephone manager unit (server).

A further example of telecommunication control over local area networks is shown in EP 0829995, but neither in this case we can find a favourable exploiting of the information technology potential; in fact, in this case the software needed to support the handling is distributed all over the network server and the client computers, as the interaction among said server and said client computers is based on conventional GUI interfaces which require to install and set up a dedicated software on each of said client computer, and this may cause conflicts between different operating systems and software pre-installed on said client computers.

In addition, it has to be noted that in DE-199 28 070 and in EP 0829995 the control, monitoring and handling of multimedial communications are not dealt.

The above desired goal of obtaining the maximum benefit from exploiting the information technology potential in the telephone communications handling over LANs is discussed elsewhere, as in U.S. Pat. No. 5,892,764 of Riemann et al, for example, but it is not achieved in a favourable way. Specifically, the software needed to support the handling is distributed all over the network server and the client computers, as the interaction among the server and the client computers is based on conventional GUI interfaces which require the installation and set up of a dedicated software on each of the client computers, and which may cause conflicts between different operating systems and software pre-installed on the client computers.

Therefore, there is a need for a method by which the above problems can be overcome through a new concept in the handling of every kind of communications over LANs, and, at the same time, obtaining the same operational flexibility and reliability offered by the traditional telephone networks, which, as we know, allow the installation of a new subscriber extremely rapidly and securely. In a LAN working in an integrated way, where a telephone set is associated with a computer, this latter aspect may contain unknown factors if the computer is based on particular hardware/software structures, different to those normally used in peripheral LAN computers, the unknown factors being due to the need to guarantee that as it functions as a telephone it should dialogue and interact rapidly and securely capacity with other telephone and informatic equipments on the LAN.

SUMMARY OF THE INVENTION

The primary object of the present invention is to propose a rational method of controlling, monitoring and handling telephone communications on a LAN capable of supporting IT data transmissions and digitalized telephone communications in an integrated way.

A further object of the invention is to propose a particularly effective method of handling communications pertaining to telephone sets associated to computers connected to a LAN as referred to above.

Another object of the invention is to propose a method of handling telephone communications, related parameters and telephone and informatic equipments, in an integrated LAN, through which obtain the maximum flexibility in installation and connection of said equipments to the network.

These and other objects are achieved using a method of handling telephone communications and related telephone and IT equipments on a LAN of the Ethernet type with a Client/Server structure, able to support multimedia IT data transmissions and digitalized telephone communications in an integrated way. The central processing unit, or server, of said LAN is provided with necessary interface for connection to the public telecommunications network and with specific software dedicated to the control, monitoring and handling of telephone communications and related telephone and IT equipments, wherein, the activation of said specific software occurs, upon interaction with peripheral LAN computers (Clients) to which said telephone equipments are associated, by using a standard browser procedure of the type used for exchanging data and commands on the Internet, so that, as regarding telephone communications, telephone sets and computers with different operating systems and different hardware/software structures can interact with one another on said LAN.

The specific software installed on the server of the LAN is dedicated, in particular, to the control and monitoring of the telephone communications, to the identification, examination and handling of the LAN telephone equipments, to the filing, recovery and processing of parameters concerning each communication, to the creation and handling of lists and tables of names and dates, including multimedia ones, to be used in effecting telephone communications. This software is installed solely on the server of the LAN.

Using a standard browser procedure installed on a peripheral computer (Client), we obtain the activation of the specific software dedicated to the monitoring activity and, consequently, the visualization, on the peripheral computer (Client) visualization means, of the status and parameters relating to the telephone communications, said activation taking place:

upon receipt of one or more telephone call signals addressed to the server or to one or more telephone equipments associated to the peripheral computers;

at the moment of lifting the telephone receiver, or equivalent operation, related to the telephone equipment associated to said peripheral computer (Client), at the time of interaction with said peripheral computers to activate, take, transfer, conclude, and handle in any other manner one or more telephone communications or, more generally, to activate said specific software.

According to the present invention, interaction with the LAN computers takes place, by using bar form graphics, placed in the lower perimeter area of the computer visualization means, including:

special graphic symbols, or icons, dedicated to the retrieval and activation of control and communication processing software;

at least one area dedicated to the monitoring of the communication, in which area various information appears, depending upon the status of said communication;

at least a further area including names and words for the visualization of further graphics and for the activation of the programmes of acquisition and handling of information from various files relating to the communications previously received or sent, to lists of telephone numbers, or from other files.

The above specific control and communication processing software provides, in particular, for the following operations:

placing incoming telephone communications on hold;

transferring telephone communications to another number;

transferring telephone communications to an automatic answering device;

retaking telephone communications previously placed on hold or transferred;

connecting more than two telephone users at one time;

allocating cost of outgoing communications to a given cost centre;

recording telephone communications.

The information that appears on the monitoring area depends on the status of the telephone communication and, more precisely, depends on whether the communication is found to be:

a—incoming;

b—in progress;

c—on hold;

d—being transferred to another number on the LAN.

According to the invention method, different control and communication processing procedures and operations may be activated, among those included in the above list, for each of the above conditions of telephone communication.

The visualization, at the same time, of several bars on the screen of the LAN computers is provided for, according to a maximum predefined number, with each of said bars being assigned to the handling of one of the communications to be found in one of the conditions listed above.

In addition, according to the invention method, the standard browser procedure permits easy activation, disactivation, identification or any other LAN telephone handling operation by the LAN manager.

From the above the advantages connected with the proposed telephone communications and related equipments handling method are immediately apparent. In particular, it has to be noticed the possibility to completely monitor the status of the communications in progress and the ability of each user to access the entire potential of the system, by way of simple interaction means, using the standard browser procedure employed for the exchange of data and commands on the LAN, both during communication, for the purpose of processing it, and for the recovery of information from files relating to communications already made or from other electronic files.

BRIEF DESCRIPTION OF THE DRAWINGS

Other characteristics and advantages of the present invention method can be better understood, however, by way of an embodiment example, with reference to the attached drawings, in which.

DESCRIPTION OF PREFERRED EMBODIMENTS

Figure 1:
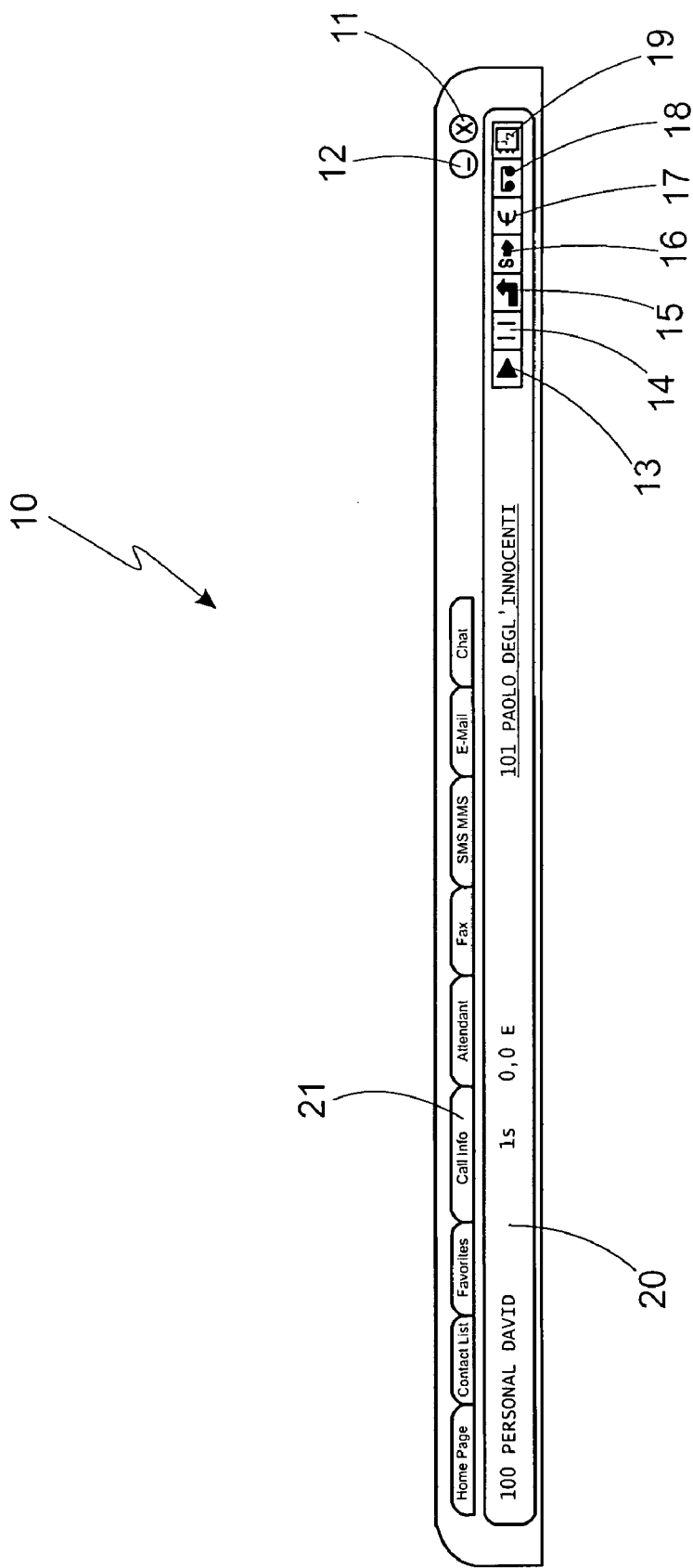
FIG. 1 shows a schematic view of bar graphics used in implementing the invention method.

With reference to FIG. 1, a bar type graph is generally indicated by 10, in which we can identify differently configured and preset areas.

One of these areas is occupied by special graphic symbols. Two of these symbols, 11 and 12, are used for closing or reducing the bar to an icon, whilst the symbols underneath are used for identifying and recalling telephone communication processing functions. In detail:

the first symbol on the left, 13, is used to recall the procedure for retaking the communication placed on hold or previously transferred to another number;

the second symbol, 14, showing two little spaced vertical bars, is used to recall the procedure for putting the communication on hold;

the third symbol on the left, 15, in which appears an arrow, is used to recall the procedure for transferring the communication to another number on the network;

the fourth symbol, 16, in which appears an arrow and the letter S, is used to recall the procedure for transferring the communication to the automatic answering device;

the fifth symbol, 17, showing the Euro symbol (€), is used to recall the procedure for allocating the cost of the communication to a specified cost centre;

the sixth symbol, 18, in which appears a recorder tape, is used to recall the procedure for recording the telephone communication;

the last symbol on the right, 19, is a general symbol used to recall another possible procedure useful, for instance, to access to web utilities.

The recall and activation of the procedures corresponding to the above symbols, or icons, takes place by simply pointing at the symbol using the graphical cursor operated by the serial communication device (mouse) of the client computer associated to the telephone concerned with the communication, and pressing the appropriate key or button on the mouse.

According to the invention method, thanks to the browser procedure used for the exchange and transmission of data and commands on the LAN, the above simple operations carried out on the bar graphics cause the precise activation of the procedure desired to take place, installed in the network server, in this way having the same operational simplicity for the handling of telephone communications on an integrated LAN as in the normal use of Internet resources.

As soon as the above procedures are activated, information and parameters relating to the communication in progress are displayed in an apposite area, 20, of bar 10. The information will obviously vary, according to the procedure called into operation, as the status of such communication varies. The information relating to the status of the telephonic equipment associated to the client computer is normally displayed in said area 20, adjacent to the zone occupied by icons 13-19, in the lower part of the screen of the computer itself.

So, the information that appears in said bar area may concern the condition of being "free" or "engaged", the name of the caller, the relevant number, duration of the communication, the cost, and other different information.

In a third apposite area, 21, of bar 10, placed above area 20, there appears, side by side, the items of a choice menu concerning the technological IT performances of the system. These particularly regard interrogations and, more generally, handling of electronic files relating to automatic answering device messages, or to lists of personalized names and numbers, or incoming and outgoing call histories, or other similar files. These also concern the possibility of handling new telephone subscribers relating to their identification and classification into determined business sectors, the identification and codification of business sectors, and other management procedures typical of system administration.

The recall and activation of the desired procedures also takes place in this area using the same operations specified above in relation to the communication processing procedures, identified by icons 13-19.

For instance, by directing the mouse cursor onto the word or wording recalling the file that is desired to access and then pressing the appropriate mouse key, a further graph is opened which permits the choice of the type of operation that is intended to undertake on the data of that file. The requested data is visualized in a specific area of the computer visualization means, according to prefixed formats and maximum quantities.

Figure 2:
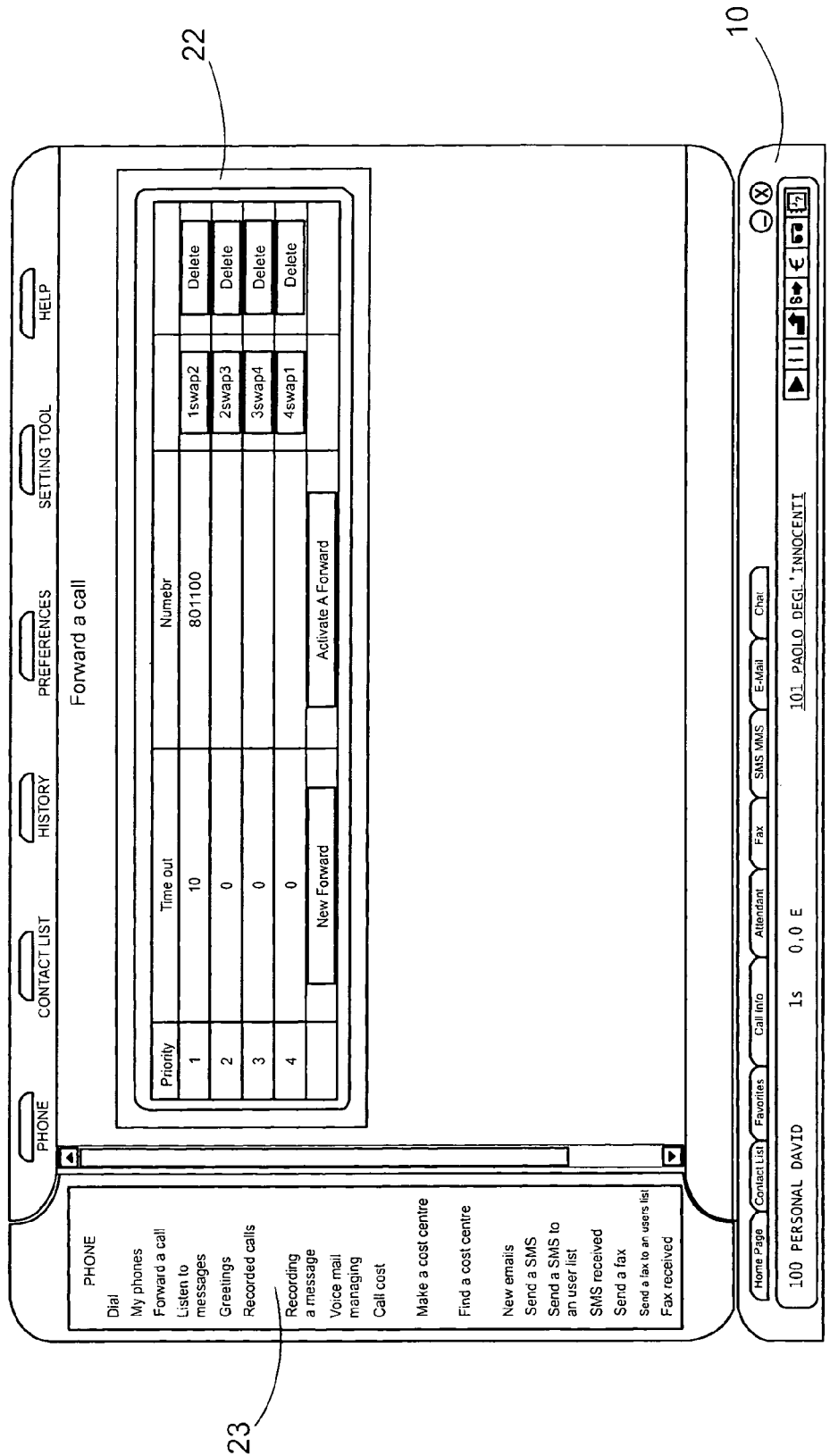
FIG. 2 shows a whole screen graphics overview which includes the graphics of FIG. 1 and any other information which may be obtained according to the invention method.

An example of what can be achieved, according to the methodology described above, is illustrated by reference to FIG. 2 which shows an overview of the graphic symbols and information which might appear on the screen of the computer associated to a determined telephone set during the running of a given procedure capable of being recalled and activated according to the invention method.

By way of example this figure deals with the forwarding of a telephone communication to others number on the network.

As we may note, a Table, 22, appears on the main area of the screen, in which there is a priority list of telephone numbers to which a user decides to transfer the call after certain amounts of time from its incoming; in the showed example only one route number is activated. In this regard, we have to note that one network user can have several equipments and telephone numbers.

In a side area, 23, there is the visualization of the possible choices which may be made in a submenu which is shown further to a choice made among the possible items displayed in area 21 of bar 10 in the lower part of the screen.

It has to be noticed that, both the data and the software dedicated to the recovery and handling of said data, are stored in the memory unit of the central processing unit, or server, of the LAN. It has to be noticed also that the recalling and activation of said software is done easily by each LAN user exploiting the graphics provided on the respective client computer and the standard type browser procedure which handles the exchange of commands and accesses between the various telephone sets connected to the LAN. This procedure of the type commonly used to navigate on the Internet, may be Microsoft Explorer or Netscape Navigator, or other similar procedure. The graphic symbols, wording and icons that normally appear in the peripheral areas of the screen during the use of said procedures have not been shown in the figure for simplicity of illustration.

The combination of the above characteristics enables the efficient handling of telephone communications on the integrated LAN. On the one hand, exploiting the LAN technological potential, we obtain an innovative way of handling such communications, keeping them fully under control on the video display while they are in progress and, on the other hand, we have the maximum flexibility in the installation or disinstallation of single telephone users, as it happens with a traditional telephone network, whatever the hardware/software structure of the computer to which the user is associated.

It is beyond doubt that such characteristics and advantages remain unaltered even though modifications and variations to the proposed embodiment of the invention are made.

The communication in progress processing procedures can be varied, for example, by also including procedures capable of associating data of multimedia content, or other procedures and programmes to the telephone communication.

The form of the graphic 10 and its position on the screen can also be varied.

It is furthermore undoubtable that the characteristics of the method proposed remain valid even applying them to the handling of telephone communications and related telephone and IT equipments on several LANs, connected with each other, capable of supporting the transmission of IT data and telephonic communications in an integrated way. In this case we may have a situation where only one of said LANs connected with each other includes a central processing unit, or server, equipped with the necessary interface for connection with the public telecommunications network, and only on this one the specific software for controlling, monitoring and handling of communications and related equipments may be installed. Alternatively, it can obviously be envisaged that a certain number of LANs connected with one another, or even all of them, may include a server having the characteristics referred to above.

Characteristics and advantages described above are included in exemplary embodiments of the present invention, as well as in the case of modifications and changes to what has been disclosed by way of example. The present invention should not be construed as limited by such examples, but rather construed according to the following claims.

The invention claimed is:

1. A method of handling telephone and multimedia communications and related voice input/output of telephone units and computer networking equipment on a local area network (LAN) with a Server computer and one or more associated Client computers in a Client/Server structure that is capable of supporting integrated data transmissions to a network of users and digitalized telephone and multimedia communications, comprising:
    providing said Server with an interface for connecting a public telecommunications network and with specific software dedicated to controlling, monitoring and handling telephone and multimedia communications and related telephone units upon activation of said specific software, and
    activating, from a Client computer, said specific software at said Server, to generate a visualization of status and parameters relating to telephone and multimedia communications, comprising a bar type graph (10) configured to access one or more subsequent visualizations (22, 23) at the Client computer, upon user interaction with the Client computer to which said telephone unit is associated by using only Internet browser procedures for exchanging data and commands on the Internet that have been installed on said Client computer in such a way that telephone units and Client computers with different operating systems and different hardware/software structures can interact on said LAN with said specific software at said Server and in response, said Server can control, monitor and handle telephone and multimedia communications at each of said telephone units and Client computers with different operating systems and different hardware/software structures, and generate at respective Client computers, a visualization of status and parameters relating to such telephone and multimedia communications,
    wherein said specific software dedicated to controlling, monitoring and handling telephone and multimedia communications and related telephone units and generate the visualization of status and parameters relating to telephone and multimedia communications is installed solely in said Server of the LAN, and not on any said Client computer.

2. The method of handling telephone and multimedia communications and related voice input/output of equipments according to claim 1 wherein one (10, 21, 23) or more standard browser procedures, of the type used for exchanging data and commands on the Internet, are installed into peripheral LAN computers (Client) to which said telephone equipments are associated.

3. The method of handling telephone and multimedia communications and related voice input/output of equipments according to claim 1 wherein said activation of said specific software takes place, without using any standard Private Branch Exchange (PBX):
    upon receipt of one or more telephone call signals addressed to the server or to one or more telephone units associated with the peripheral computers,
    at the moment of lifting the telephone receiver, or equivalent operation, related to the telephone equipment associated to said peripheral computers (Client), or
    at the moment of interacting with said peripheral computers to activate, take, transfer, conclude, and handle in any other manner one or more telephone and multimedia communications or, more generally, to activate said specific software.

4. The method of handling telephone and multimedia communications and related voice input/output of equipments according to claim 1, wherein said specific software installed in the server of the LAN is capable of:
    controlling and monitoring the telephone and multimedia communications (21, 23),
    identifying, qualifying, and handling the LAN telephone units,
    filing, recovering and processing parameters concerning each telephone and multimedia communication (21, 23), and
    creating and handling lists and tables of names and data, including multimedia, to be used in effecting telephone and multimedia communications (21, 23).

5. The method of handling telephone and multimedia communications and related voice input/output of equipments according to claim 1, wherein the activation of said specific software and visualization of status and parameters relating to telephone and multimedia communications (10, 21, 23) takes place, by using, on the computers visualization means, graphic symbols (13-19) dedicated to the activation of said specific software and areas (20, 22) dedicated to the monitoring of the telephone and multimedia communication parameters.

6. The method according to claim 5, wherein said graphics are bar shaped (10), comprising:
    special graphic symbols, or icons, (13-19) dedicated to the retrieval and activation of specific software for controlling telephone and multimedia communications;
    at least one area (20) dedicated to the visualization of parameters and information allowing the monitoring of the telephone and multimedia communications; and
    at least a further area (21) including names and words for the visualization of further graphics and for retrieving and activating said specific software for telephone and multimedia communications installed solely in said Server of the LAN, said further graphics comprising at least one area (23) for displaying communication information.

7. The method according to claim 5 wherein said bar shaped graphics are placed in a lower perimeter area of said visualization means and that the kind of the telephone and multimedia communications parameters displayed in said area (20) varies according to the status of said communications.

8. The method according to claim 5 wherein said specific software dedicated to the control of telephone and multimedia communications provides the following operations:

placing the incoming telephone communication on hold (14);

transferring the telephone communication to another number (15);

transferring the telephone communication to an automatic answering device (16);

retaking a telephone communication previously placed on hold or transferred (13);

connecting more than two telephone users at one time;

allocating cost of outgoing communications to a given cost centre (17);

recording the telephone communication (18); and accessing web utilities—video managing (19).

9. The method according to claim 1 wherein said specific software may be retrieved and activated according to a condition of said telephone and multimedia communications, said condition being selected from:

receipt of an incoming communication;

a communication in progress;

a communication on hold; and a communication being transferred to another number on the LAN.

10. The method according to claim 9 wherein said visualization comprises several bars (10), each of the said bars (10) being assigned to the handling of one of the communications to be found in one of said conditions.

11. The method of handling telephone and multimedia communications and related voice input/output of equipments according to claim 1, characterized by the fact that said telephone and multimedia communications and said equipments interact on one or more LANs able to support, in an integrated way, the data transmissions, and digitalized telephone and multimedia communications, said LANs being connected with each other, and at least one of said LANs includes a central processing unit, or server, equipped with the necessary interface for connection with the public telecommunications network.

\* \* \* \* \*